US012561973B2

(12) United States Patent
Manohar et al.

(10) Patent No.: US 12,561,973 B2
(45) Date of Patent: Feb. 24, 2026

(54) DRONE-BASED LOWEST FLOOR ELEVATION

(71) Applicants: University of Florida Research Foundation, Inc., Gainesville, FL (US); Baalaganapathy Manohar, Lexington, KY (US)

(72) Inventors: Baalaganapathy Manohar, Gainesville, FL (US); Rahul Aggarwal, Gainesville, FL (US); Ravi S. Srinivasan, Gainesville, FL (US); Sourabh Kakade, Gainesville, FL (US); Qusai Nalawala, Gainesville, FL (US)

(73) Assignees: Baalaganapathy Manohar, Lexington, KY (US); University of Florida Research Foundation, Inc., Gainesville, FL (US)

( * ) Notice: Subject to any disclaimer, the term of this patent is extended or adjusted under 35 U.S.C. 154(b) by 340 days.

(21) Appl. No.: 18/035,903

(22) PCT Filed: Nov. 8, 2021

(86) PCT No.: PCT/US2021/072286
§ 371 (c)(1),
(2) Date: May 8, 2023

(87) PCT Pub. No.: WO2022/126054
PCT Pub. Date: Jun. 16, 2022

(65) Prior Publication Data
US 2024/0119729 A1     Apr. 11, 2024

Related U.S. Application Data

(60) Provisional application No. 63/111,240, filed on Nov. 9, 2020.

(51) Int. Cl.
| | |
|---|---|
| *G06V 20/10* | (2022.01) |
| *G06T 7/12* | (2017.01) |
| *G06V 10/26* | (2022.01) |

(52) U.S. Cl.
CPC .............. *G06V 20/176* (2022.01); *G06T 7/12* (2017.01); *G06V 10/26* (2022.01);
(Continued)

(58) Field of Classification Search
CPC .... G06V 20/176; G06V 10/26; G06V 10/143; G06V 20/17; G06T 7/12;
(Continued)

(56) References Cited

U.S. PATENT DOCUMENTS

| | | | | |
|---|---|---|---|---|
| 2017/0236024 A1* | 8/2017 | Wang | ................... | G06V 20/176 |
| | | | | 382/201 |
| 2018/0129210 A1* | 5/2018 | Achtelik | .............. | G05D 1/0094 |

(Continued)

OTHER PUBLICATIONS

International Searching Report and Written Opinion mailed on Jun. 29, 2022 for PCT Patent Application No. PCT/US2021/072286.

*Primary Examiner* — Oneal R Mistry
*Assistant Examiner* — Jongbong Nah
(74) *Attorney, Agent, or Firm* — Thomas | Horstemeyer, LLP

(57) ABSTRACT

The present disclosure describes systems and methods for acquiring structural attributes of a building. One such method comprises acquiring, by one or more cameras of an unmanned aerial vehicle, infrared thermal and visible RGB aerial images of a building; identifying structural components of the building based on an infrared thermal aerial image, wherein a floor structure of the building is identified from a color change in the infrared thermal aerial image between the building and a foundation structure of the building; positioning a bounding box around the floor structure of the building present in the infrared thermal aerial
(Continued)

image; and estimating a lowest floor elevation of the building by calculating a lowest floor elevation value based on an amount of image pixels representing a distance between a top of the bounding box and a top of the foundation structure of the building. Other methods and systems are also provided.

20 Claims, 6 Drawing Sheets

(52) U.S. Cl.
CPC ............... *G06T 2207/10024* (2013.01); *G06T 2207/10032* (2013.01); *G06T 2207/10048* (2013.01); *G06T 2207/30184* (2013.01)

(58) Field of Classification Search
CPC ........... G06T 2207/10024; G06T 2207/10032; G06T 2207/10048; G06T 2207/30184; B64U 2101/30; Y02A 10/40
See application file for complete search history.

(56) References Cited

U.S. PATENT DOCUMENTS

| | | | | |
|---|---|---|---|---|
| 2019/0155973 | A1* | 5/2019 | Morczinek | G06F 30/13 |
| 2020/0082168 | A1* | 3/2020 | Fathi | G06T 7/521 |
| 2020/0348132 | A1* | 11/2020 | Du | G01C 5/00 |

* cited by examiner

Post processing

Post processing

DRONE-BASED LOWEST FLOOR ELEVATION

CROSS-REFERENCE TO RELATED APPLICATIONS

This application is the 35 U.S.C. § 371 national stage application of International Application No. PCT/US2021/072286, filed Nov. 8, 2021, which claims priority to U.S. provisional application entitled, "Drone-Based Lowest Floor Elevation (dLFE)," having Ser. No. 63/111,240, filed Nov. 9, 2020, which is entirely incorporated herein by reference.

STATEMENT REGARDING FEDERALLY SPONSORED RESEARCH OR DEVELOPMENT

This invention was made with government support under Grant No. 1951997 awarded by the National Science Foundation. The government has certain rights in the invention.

TECHNICAL FIELD

The present disclosure is generally related to the acquisition of building structure attributes using imaging techniques.

BACKGROUND

The need for flood hazard classification of building structures is critical for pre-disaster management and post-disaster mitigation. The importance cannot be understated especially with the rising sea levels and the threat of global warming. Among others, one of the important attributes is the Lowest Floor Elevation (LFE). According to U.S. Federal Emergency Management Agency (FEMA), LFE is the elevation of the bottom enclosure floor. LFE data is an integral part of a building's elevation certificates. Besides flood hazard management issues, elevation certificates are used to create models for flood insurance premiums.

SUMMARY

Embodiments of the present disclosure provide imaging systems and methods for acquiring structural attributes of a building. Briefly described, one embodiment of the system, among others, includes a computing device comprising a processor and a memory and machine-readable instructions stored in the memory that, when executed by the processor, cause the computing device to at least acquire one or more infrared thermal aerial images of a building and one or more visible RGB aerial images of the building; identify structural components of the building based on the one or more infrared thermal aerial images of the building, wherein a floor structure of the building is identified from a color change in the one or more infrared thermal aerial images between the building and a foundation structure of the building; position a bounding box around the floor structure of the building present in the one or more infrared thermal aerial images; and estimate a lowest floor elevation of the building by calculating a lowest floor elevation value based on an amount of image pixels representing a distance between a top of the bounding box and a top of the foundation structure of the building.

The present disclosure can also be viewed as providing imaging methods for acquiring structural attributes of a building. In this regard, one embodiment of such a method comprises acquiring, by one or more cameras of an unmanned aerial vehicle, one or more infrared thermal aerial images of a building and one or more visible RGB aerial images of the building; identifying, by a computing device, structural components of the building based on the one or more infrared thermal aerial images of the building, wherein a floor structure of the building is identified from a color change in the one or more infrared thermal aerial images between the building and a foundation structure of the building; positioning, by the computing device, a bounding box around the floor structure of the building present in the one or more infrared thermal aerial images; and estimating, by the computing device, a lowest floor elevation of the building by calculating a lowest floor elevation value based on an amount of image pixels representing a distance between a top of the bounding box and a top of the foundation structure of the building.

In one or more aspects, the system/method may further comprise generating a corrected right angle infrared thermal aerial image of at least a portion of the building by horizontally distributing pixels along a straight line across the portion of the building, wherein the pixel ratio factor is determined using the corrected right angle infrared thermal aerial image, wherein a view of the building is tilted in at least one of the one or more infrared thermal aerial images; configuring a flight plan for the unmanned aerial vehicle to a plurality of buildings, wherein the unmanned aerial vehicle acquires the one or more visible RGB aerial images and the one or more infrared thermal aerial images for each of the plurality of buildings during execution of the flight plan; predicting a foundation type for the building based on the one or more visible RGB aerial images; estimating an Envelope Energy Performance signature for the building based on the one or more visible RGB aerial images and the one or more infrared thermal aerial images; and/or determining a foundation type for the building based on the one or more visible RGB images and the one or more infrared thermal aerial images.

In one or more aspects of the system/method, the lowest floor elevation value for the building is calculated by converting the amount of image pixels representing the lowest floor elevation into the lowest floor elevation value in terms of a measurement of distance using a pixel ratio factor; the measurement of distance comprises feet under the imperial measurement system and the pixel ratio factor comprises a pixel per feet ratio; an obstruction is present in the one or more infrared thermal aerial images and the bounding box is positioned by joining two bounded boxes on each side of the obstruction; and/or the computing device is trained to predict the foundation type using a database of building images.

Other systems, methods, features, and advantages of the present disclosure will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
FIG. 1 shows digital images of building #1 (left) and building #2 (right) that are the subject of experimental testing of exemplary imaging systems and methods for acquiring structural attributes of a building in accordance with various embodiments of the present disclosure.
Figure 1:

The present disclosure describes various embodiments of imaging systems, apparatuses, and methods for acquiring structural attributes of a building, such as drone-based lowest floor elevation (dLFE) values, for aerial flood risk management using a drone (Unmanned Aerial Vehicle (UAV)).

With accelerating sea level rise, coupled with the potential for more intense storm events, housing stock all along the United States (U.S.) coast is at risk. Nowhere is this more apparent than in the State of Florida. Florida ranks first in the nation for estimated potential residential exposure to hurricane storm surge damage, with more than 2.9 million at-risk single and multifamily homes, and an associated reconstruction cost value greater than $600 billion. Thus, it is critical for communities across Florida, and specifically the Apalachee and Tampa Bay Regional Planning Council (ARPC and TBRPC), to proactively plan for coastal flood risk reduction strategies as well as to develop post-disaster recovery strategies for coastal housing—specifically affordable housing—in advance of coastal storm events. Coastal communities need a detailed and comprehensive assessment of the location and characteristics of vulnerable housing and populations in order to determine existing flood mitigation and potential disaster recovery needs. Among others, one of the important attributes is the Lowest Floor Elevation (LFE).

The need for flood hazard classification of building structures is critical for pre-disaster management and post-disaster mitigation. The importance cannot be understated especially with the rising sea levels and the threat of global warming. Besides flood hazard management issues, LFEs and Elevation Certificates (ECs) are used to create models for flood insurance premiums.

Accordingly, urban resilience and sustainability are critical, but these issues are often addressed by different technical tools. Existing practices to calculate LFE values are required at site-scale for newer constructions, while envelope energy leakages are cost prohibitive and are performed one building-at-a-time. Additionally, existing methods to calculate LFEs are cost prohibitive especially when performed by a surveyor as well as these typically being performed one building-at-a-time. Such methods do not support active management of pre-disaster flood risk. Most recently, one study by Chen et al. used Machine Learning (ML) to identify the foundation type followed by LFEs estimation. See Chen, F., Jahanshahi, M., Johnson, D. R., Delp, E., "Structural Attributes Derived from Google Street View imagery, Louisiana Coastal Zone," Purdue University Research Repository (2020). This approach utilized the Google StreetView™ images to teach ML to identify the different foundation types by using a database of approximately 70,000 data points. This study showed uncertainty in LFE measurement of up to 0.51 feet. Since this approach uses images taken from streets, obstructions (objects such as parked cars, people, and other structures in front of buildings) primarily cause identification and estimation errors.

The present disclosure presents an integrated approach to more cost-effectively calculate, in a non-intrusive manner a building's lowest floor elevation (LFE) used in flood risk analysis. In various embodiments, an imaging system for acquiring structural attributes of a building using artificial intelligence (AI), graphics processing unit (GPU)-accelerated image processing, and a dual-imaging drone is presented that can detect foundation types and predict LFEs at one-hundredth less time and cost with no loss of quality.

An exemplary imaging system for acquiring structural building attributes utilizes an Unmanned Aerial Vehicle (UAV) or drone. Accordingly, the present disclosure offers initial research in the development of novel methods to seamlessly gather, store, and extract relevant physical attributes for flood hazard management using an Unmanned Aerial Vehicle (UAV). As such, via the UAV's digital visible imaging (RGB) sensor and infrared thermal (IRT) imaging sensor, a series of images can be captured at predefined positions in front of the building structures, in accordance with various embodiments of the present disclosure. The captured pictures can then be processed by algorithms for estimating the LFE per FEMA (Federal Emergency Management Agency).

Thus, one objective of the present disclosure is to develop a technology which can, on a large scale, quickly and accurately measure the LFEs or any other physical aspect of a building without any limitations. A driving force for this technology is utilizing the thermal image of a building to identify the LFE along with the digital image. A database can then be created of these images and machine learning can be used as an additional validation tool, in various embodiments.

In initial experiments, target entities encompass two buildings (as shown by the aerial images of FIG. 1, where the figure is shown as black and white in the disclosure but represent color (RGB) aerial images) that were the subject of experimental testing of imaging systems and methods for acquiring structural attributes of a building in accordance with various embodiments of the present disclosure. One reason for selecting these buildings is that the LFEs for these two buildings are clearly visible as seen from the pictures and this makes them suitable candidates to test the technology. After charting out a flight plan, a drone (UAV) is operated by a pilot for preliminary experiments, but autonomous flight path is featured in alternative embodiments. Accordingly, in various embodiments, one or more computing devices can be configured to generate or configure a flight plan for the unmanned aerial vehicle to a plurality of buildings and transmit the flight plan to the UAV, wherein the unmanned aerial vehicle acquires the one or more visible RGB aerial images and the one or more infrared thermal aerial images for each of the plurality of buildings during execution of the flight plan.

The UAV automatically collects and stores the relevant aerial data associated with the buildings, such as thermal and visible RGB aerial images. In various embodiments, acquired thermal aerial images are used to obtain temperature difference between the conditioned area (inside of a building), the outside surface, and/or the outside temperature.

Figure 2:
FIG. 2 shows an infrared thermal (IRT) image of building #1 that is captured by an exemplary imaging system for acquiring structural attributes of a building of the present disclosure.
Figure 2:

For these experiments, the drone that was used is the DJI MAVIC DUAL ENTERPRISE, which is integrated with an infrared thermal (IRT) imaging sensor/camera and a visible imaging sensor/camera. The thermal camera (having an IRT imaging sensor) has a resolution of 640×480 pixels and the digital color camera (having a visible imaging sensor) has a resolution of 4056×3040 pixels. Aerial data that is captured includes the thermal images in addition to visible RGB images. The captured data is stored within a memory of the drone. FIG. 2 shows thermal aerial images that were captured by the drone of the two buildings (where the figure is shown as black and white in the disclosure but represent color thermal aerial images).

Figures 3, 4:
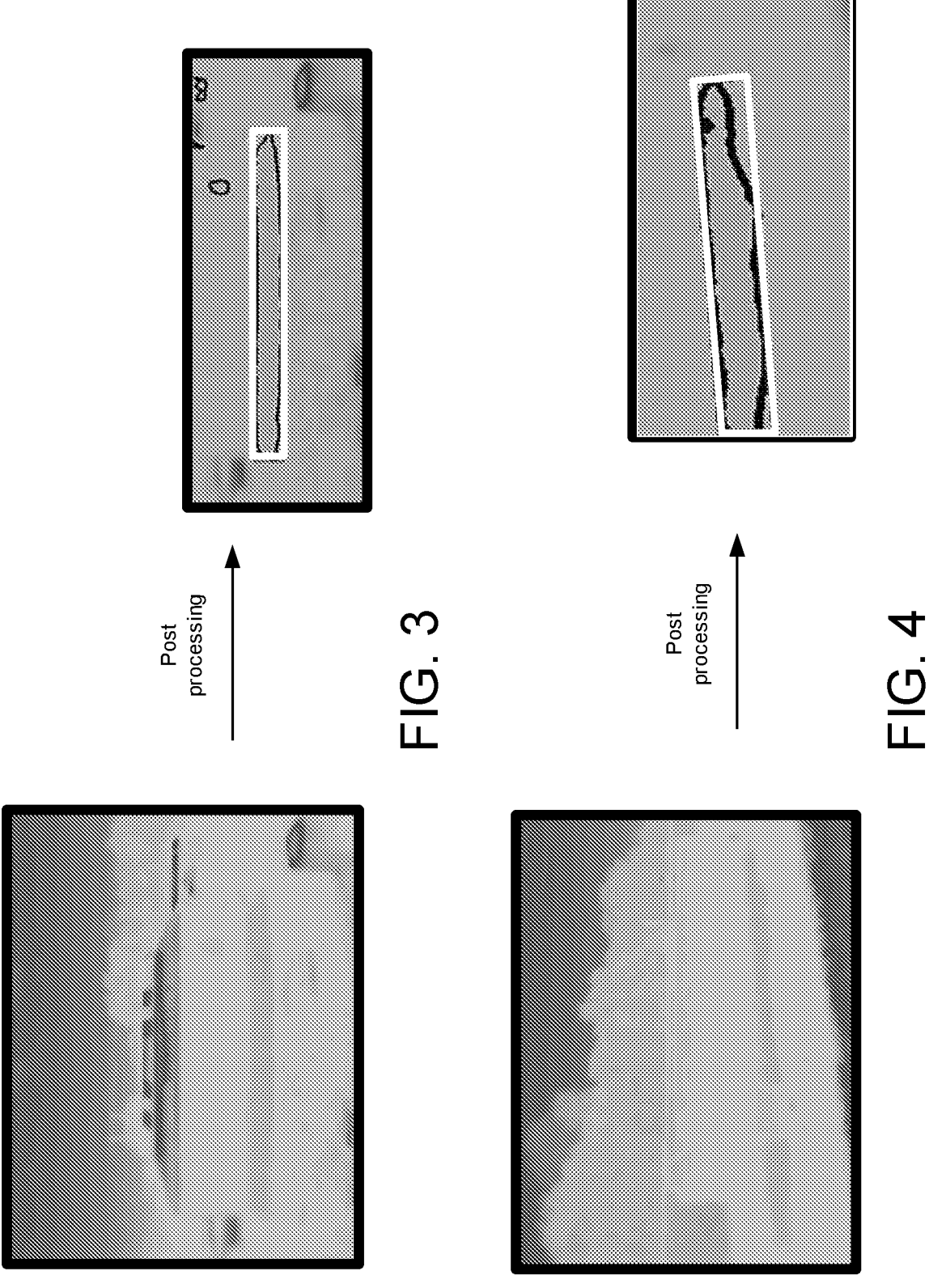
FIG. 3 shows a post-processed IRT image of building #1 by an exemplary imaging system for acquiring structural attributes of a building of the present disclosure.
FIG. 4 shows a post-processed IRT image of building #2 by an exemplary imaging system for acquiring structural attributes of a building of the present disclosure.

In various embodiments, the drone or UAV transfers the captured data to a remote computing device, such that, in one embodiment, the computing device is configured to process the captured images using a python script that detects the color change between the respective building and the foundation structure mainly due to the difference in their temperature. In various embodiments, the computing device or computer is programmed to draw a bounding box across a bottom enclosure floor of the building structure, as shown in FIG. 3 for building #1 and FIG. 4 for building #2 (where the figures are shown as black and white in the disclosure but represent color thermal aerial images). In various non-limiting embodiments, a pixel ratio factor (e.g., pixels per feet, pixels per meter, etc.) for each of these buildings can be calculated using the Geographic Information System (GIS) data for the building and the LFE can be calculated by the computing device. The calculated LFEs for the two buildings are shown below in Table 1.

TABLE 1

| Building | Calculated (inches) | Measured (inches) | Error (inches) |
|---|---|---|---|
| Building #1 | 25.3796 | 24 | 1.3796 |
| Building #2 | 25.6931 | 23 | 2.6931 |

In the table, the LFE for the two buildings were physically measured and compared to the calculated value from an exemplary imaging system/method. As seen in the table, the calculated LFE values are quite close to the actual measured values with a maximum error for building #2 of about 2.69 inches. The error in the estimated LFE in the two buildings is 1.3 inches and 2.6 inches, respectively, which is an improvement from the 0.51 feet (6.12 inches) achieved by Chen et al.

Figure 5:
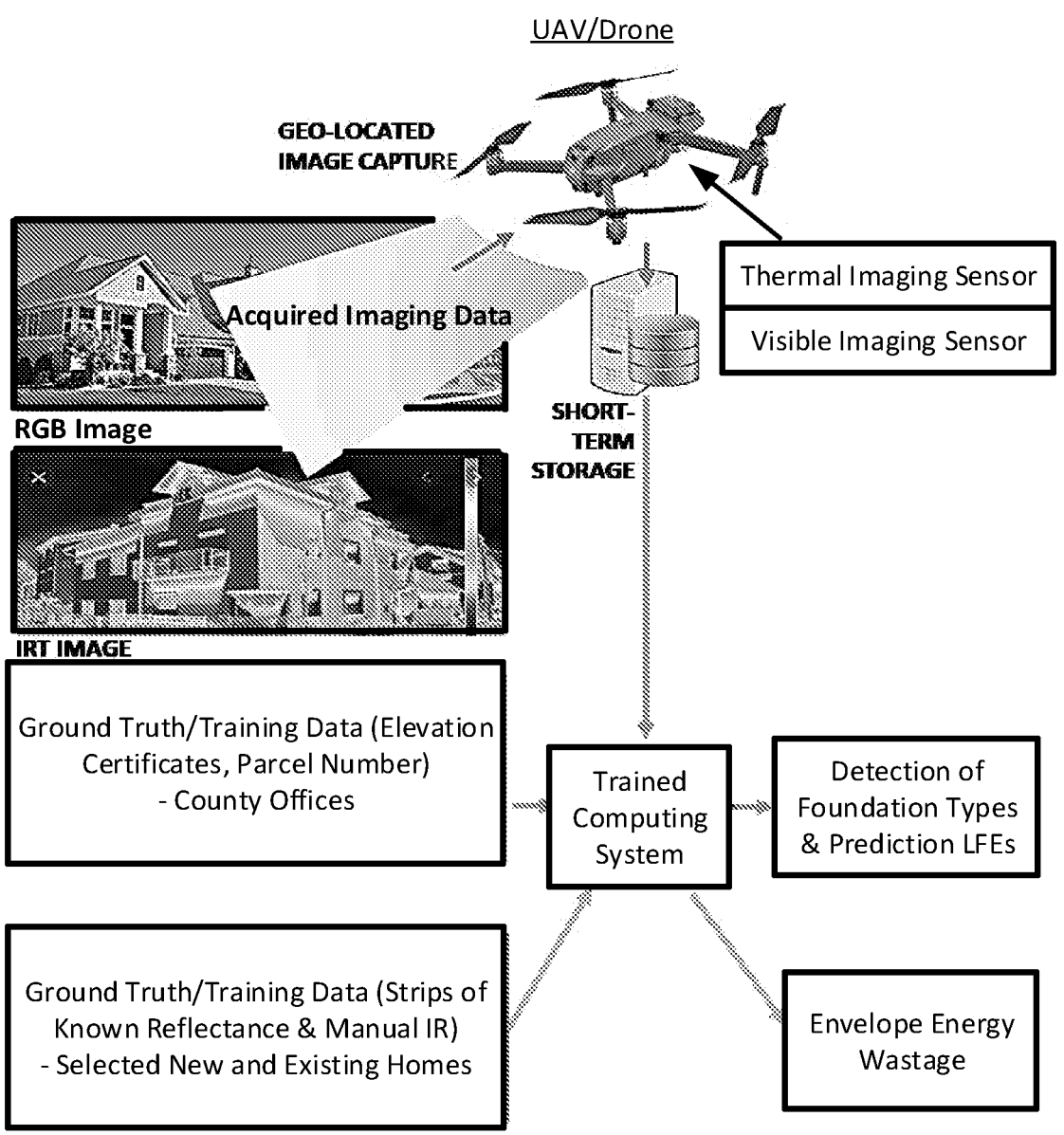
FIG. 5 shows components of an exemplary flow process for an exemplary imaging system for acquiring structural attributes of a building in accordance with various embodiments of the present disclosure.

Needless to say, as these are high-resolution images, the volume of data that will be generated as a result of these flights will be relatively large. For flood risk, using GPU-accelerated image processing techniques, dual-images of building structures to (a) detect the foundation types and (b) predict LFEs are utilized, in various embodiments, as there are several common foundation types: pier, slab, etc. Accordingly, the issue of obstructions in front of buildings can be resolved using the dual-image processing, wherein IRT images augments visible RGB images, as shown in an exemplary flow process of FIG. 5. In various embodiments, the foundation types and floor slabs are determined using customized image filtering algorithms. The ground truth data (e.g. foundation types from county and available ECs for LFEs) can be used to train the algorithms and/or models implemented by a trained computing system having one or more computing devices (e.g., the University of Florida's HiPerGator Artificial Intelligence Computing System), as illustrated in FIG. 5. Such an approach provides a significant improvement over existing approaches to determine foundation types and predict LFEs. In one embodiment, a convolutional neural network can be used to detect features and predict LFEs and Envelope Energy Performance (EEP) from high-resolution images, as depicted in FIG. 5. In various embodiments, building envelop energy wastage can be estimated and an EEP generated in addition to foundation type and LFE values for a respective building being evaluated.

Consider that cities and counties typically do not have updated information of their buildings' Envelope Energy Performance (EEP) as such audits are expensive and time consuming. This lack of updated EEP data leads to ineffective management of resource allocations (e.g. weatherization programs, roof replacements). As the adage goes, "if we cannot measure, we cannot manage," EEP is particularly important as material thermal performance degrades over time. The data from the original drawings or documents submitted to the building permit offices may not provide accurate data on thermal performance owing to the fact that materials degrade over time. Moreover, previous studies involving inventor R. S. Srinivasan have shown significant thermal bridging effects in commercial buildings owing to the use of metal fasteners—which are not captured even in the original roof specifications available with cities and counties. See Manan, S., Gulati, R., Srinivasan, R. S., Bhandari, M., "Impact Study of Metal Fasteners in Roofing Assemblies using Three-Dimensional Heat Transfer Analysis," Buildings 2016, Vol. 6, Issue 4 (2016); and Gulati, R., Suddapalli, S., Srinivasan, R. S., "Energy Impacts of Roof Fasteners for Metal Deck Roofing Systems during Re-Roofing and Re-Cover Scenarios," RCI Conference (Roofing Consultants Institute), Orlando (2016). It is to be noted that, currently, only a small fraction of buildings is audited for envelope energy leakages. Mostly, these are on voluntary basis, i.e., if the owner requests such energy audits. Without updated EEP data, a large portion of electricity is wasted. With an EEP signature of every building, cities and counties can develop targeted programs to promote reduction of such energy wastage. Such data can be acquired using system and methods of the present disclosure.

As discussed, LFE can be determined based on the temperature difference between foundation of the building and rest of an acquired thermal aerial image. In various embodiments, the building length is estimated by appropriately finding the contour of the foundation. The number of JPEG pixels per feet (PPF) can be calculated from the previously estimated length and the actual length of the building from GIS data. All the contours that match the temperature range of the foundation of the building are detected and the vertices and angles of the rectangles/contours are stored. In some embodiments, if an obstruction hinders two contours, the contours are combined if they have approximately equal angles, heights and if the rotated rectangle angle matches with the cosine inverse of two top left points.

Figure 6:
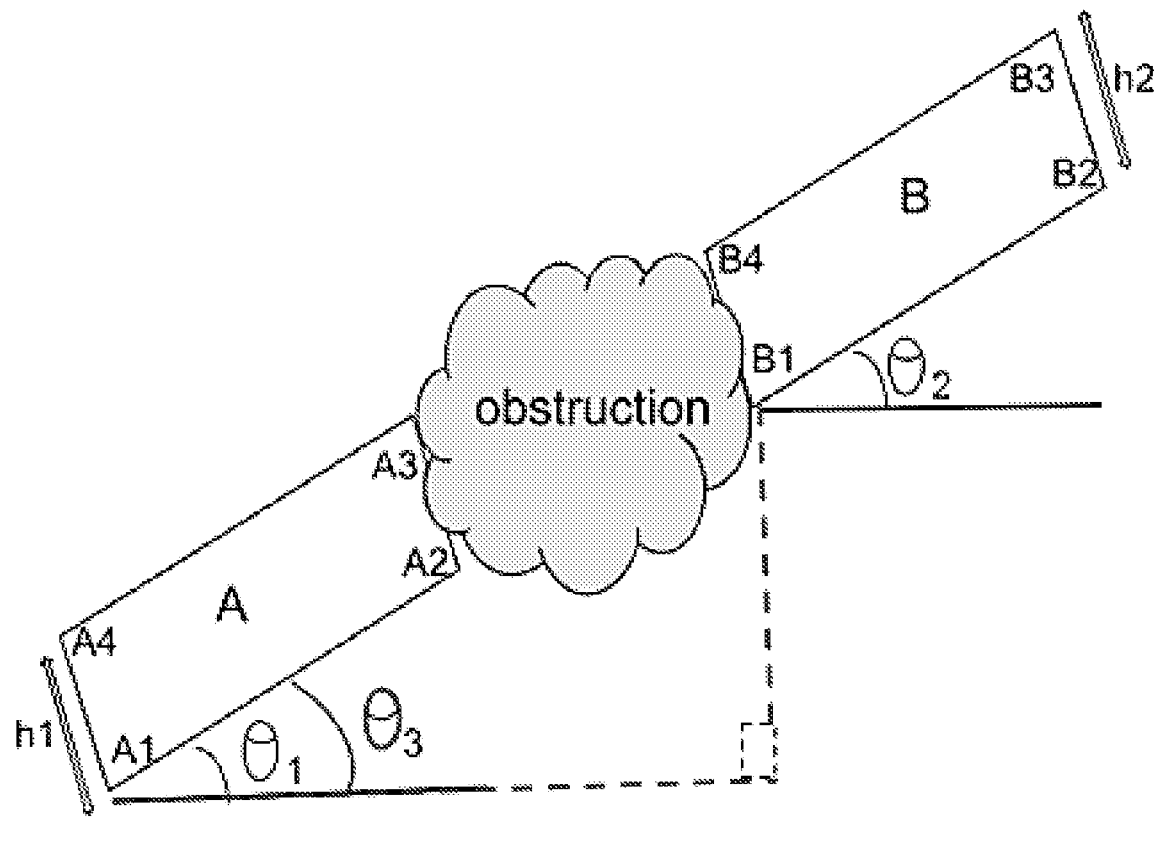
FIG. 6 shows a view of two contours of a foundation of a building being hindered by an obstruction in accordance with the present disclosure.

As illustrated in FIG. 6, in various embodiments, to draw the bounding box around the building, we combine or join the contours (separated by an obstruction) if the condition stated below is satisfied.

$$\text{Angle } 1 \cong \text{Angle } 2 \cong \text{Angle 3 and } h_1 \cong h_2$$

where Angle 3=cos⁻¹((B1.x–A1.x)/distance(A1,B1)).

$$\text{Angle } 1 \widetilde{\cong} \text{ Angle } 2 \widetilde{\cong} \text{ Angle 3 and } h_1 \widetilde{\cong} h_2$$

Thus, the bounding box can be drawn by joining two bounded boxes on each side of the obstruction. In such a case the building length can be estimated to be:

$$\text{box\_length}=\text{distance}(B1(x,y),A1(x,y))+\text{distance}(B2(x,y),B1(x,y)).$$

As shown below, the LFE is obtained from a pixel ratio factor comprising the ratio of pixel per feet and height of the rectangle/contour, where pixel per feet is the ratio of original building length from GIS (input_length) and estimated building length (box_length):

$$\text{pixel\_per\_feet}=\text{input\_length/box\_length}$$

$$\text{LFE}=\text{pixel\_per\_feet/height}.$$

The calculation of LFE depends mainly on the pixel per feet ratio obtained by comparing the thermal aerial image with the GIS data. The accuracy of the results depends on the accuracy of the pixel per feet ratio. To achieve an exact pixel per feet ratio, the image needs to be taken with the line of sight of camera exactly perpendicular to the building surface. That is generally not the case, which makes the building image a bit tilted, and hence the imposition of the straight-line GIS length over a tilted building geometry in the images can result in errors in the obtained PPF ratio.

Accordingly, in various embodiments, an exemplary methodology for obtaining the PPF ratio can reduce errors using image projections and obtaining a right angle building image (that corrects tilting) before comparing the image with the GIS length to obtain the PPF ratio. The foregoing approach will reduce the error in the LFE calculations.

Figure 7:
FIG. 7 shows a rectangle bounding box for a condition area of a sample building for an acquired visible RGB image (displayed as a top image) and an acquired thermal aerial image (displayed as a bottom image) in accordance with various embodiments of the present disclosure.

A tilted building geometry in an image can be straightened by adjusting all four angles of a box or rectangle contour for the condition area (inside of a building), where FIG. 7 illustrates a rectangular bounding box for a condition area of a sample building for an acquired visible RGB aerial image (displayed as a top image) and an acquired thermal aerial image (displayed as the bottom image), where the figure is shown as black and white in the disclosure but represents color aerial images. The bottom portion of the respective image corresponding to the foundation structure is kept intact, as adjusting the bottom portion will affect the actual LFE results. Hence, the bottom portion is not part of the condition area and adjustments will only be made to the condition area. In various embodiments, a computer-implemented method can analyze a text file of a thermal aerial image (FIG. 7B) of the building (e.g., csv file) that stores temperature data of the thermal aerial image of a building and divide the data for the conditioned area into matrices of varying sizes, where each column contains a varying number of rows that includes the data of the conditioned area. Hence, there will be many matrices that will together comprise the conditioned area, all of different sizes. In order to make the matrices equally sized, the method can selectively remove pixels from a top end in the matrices to make them equal in size to the smallest matrix, which will result in a horizontal distribution of pixels along a straight line and result in a more accurate PPF ratio. Accordingly, in various embodiments, a corrected right angle thermal image of at least a portion of the building can be generated by horizontally distributing pixels along a straight line across the portion of the building, wherein the pixel ratio factor is determined using the corrected right angle thermal image.

Figure 8:
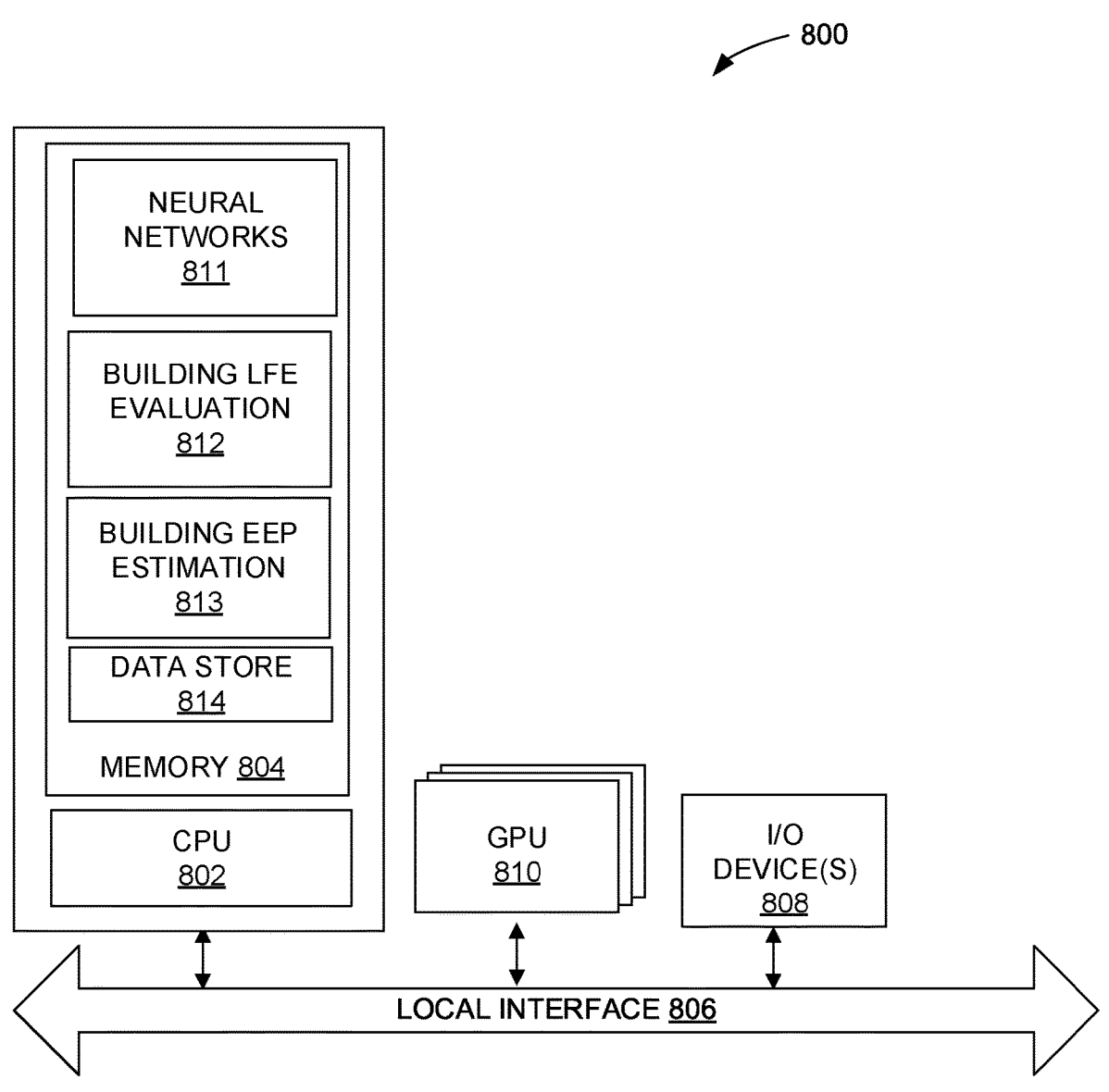
FIG. 8 depicts a schematic block diagram of a computing device that can be used to implement various embodiments of the present disclosure.

FIG. 8 depicts a schematic block diagram of a computing device 800 that can be used to implement various embodiments of the present disclosure. An exemplary computing device 800 includes at least one processor circuit, for example, having a processor 802 and a memory 804, both of which are coupled to a local interface 806, and one or more input and output (I/O) devices 808. The local interface 806 may comprise, for example, a data bus with an accompanying address/control bus or other bus structure as can be appreciated. The computing device 800 further includes Graphical Processing Unit(s) (GPU) 810 that are coupled to the local interface 806 and may utilize memory 804 and/or may have its own dedicated memory. The CPU and/or GPU(s) can perform various operations such as image enhancement, graphics rendering, image/video processing, recognition (e.g., text recognition, object recognition, feature recognition, etc.), image stabilization, machine learning, filtering, image classification, and any of the various operations described herein.

Stored in the memory 804 are both data and several components that are executable by the processor 802. In particular, stored in the memory 804 and executable by the processor 802 are code for implementing one or more neural networks 811 (e.g., artificial and/or convolutional neural network models) and building LFE evaluation algorithms or code 812 and/or budding EEP estimation algorithms or code 813 in accordance with embodiments of the present disclosure. Also stored in the memory 804 may be a data store 814 and other data. The data store 814 can include an image database and potentially other data related to the computations performed by the neural network models 811 and/or the evaluation/estimation algorithms 812, 813. In addition, an operating system may be stored in the memory 804 and executable by the processor 802. The I/O devices 808 may include input devices, for example but not limited to, a keyboard, mouse, RGB imaging sensor/camera, IRT imaging sensor/camera, etc. Furthermore, the I/O devices 808 may also include output devices, for example but not limited to, a printer, display, etc.

Embodiments of the present disclosure can be implemented in hardware, software, firmware, or a combination thereof. In an exemplary embodiment, building LFE evaluation and/or EEP estimation logic or functionality is implemented in software or firmware that is stored in a memory and that is executed by a suitable instruction execution system. If implemented in hardware, as in an alternative embodiment, building LFE evaluation and/or EEP estimation logic or functionality can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

It should be emphasized that the above-described embodiments are merely possible examples of implementations, merely set forth for a clear understanding of the principles of the present disclosure. Many variations and modifications may be made to the above-described embodiment(s) without departing substantially from the principles of the present disclosure. All such modifications and variations are intended to be included herein within the scope of this disclosure.

The invention claimed is:

1. A method comprising:
acquiring, by one or more cameras of an unmanned aerial vehicle, one or more infrared thermal aerial images of a building and one or more visible RGB aerial images of the building;
identifying, by a computing device, structural components of the building based on the one or more infrared thermal aerial images of the building, wherein a floor structure of the building is identified from a color change in the one or more infrared thermal aerial images between the building and a foundation structure of the building; positioning, by the computing device, a bounding box around the floor structure of the building present in the one or more infrared thermal aerial images; and
estimating, by the computing device, a lowest floor elevation of the building by calculating a lowest floor elevation value based on an amount of image pixels representing a distance between a top of the bounding box and a top of the foundation structure of the building.

2. The method of claim 1, wherein the lowest floor elevation value for the building is calculated by converting the amount of image pixels representing the lowest floor elevation into the lowest floor elevation value in terms of a measurement of distance using a pixel ratio factor.

3. The method of claim 2, wherein the measurement of distance comprises feet under an imperial measurement system and the pixel ratio factor comprises a pixel per feet ratio.

4. The method of claim 3, wherein a view of the building is tilted in at least one of the one or more infrared thermal aerial images, the method further comprising generating, by the computing device, a corrected right angle infrared thermal aerial image of at least a portion of the building by horizontally distributing pixels along a straight line across the portion of the building, wherein the pixel ratio factor is determined using the corrected right angle infrared thermal aerial image.

5. The method of claim 1, wherein an obstruction is present in the one or more infrared thermal aerial images and the bounding box is positioned by joining two bounded boxes on each side of the obstruction.

6. The method of claim 1, further comprising configuring, by the computing device, a flight plan for the unmanned aerial vehicle to a plurality of buildings, wherein the unmanned aerial vehicle acquires the one or more visible RGB aerial images and the one or more infrared thermal aerial images for each of the plurality of buildings during execution of the flight plan.

7. The method of claim 1, further comprising predicting, by the computing device, a foundation type for the building based on the one or more visible RGB aerial images.

8. The method of claim 7, wherein the computing device is trained to predict the foundation type using a database of building images.

9. The method of claim 1, further comprising estimating, by the computing device, an Envelope Energy Performance signature for the building based on the one or more visible RGB aerial images and the one or more infrared thermal aerial images.

10. The method of claim 1, further comprising determining, by the computing device, a foundation type for the building based on the one or more visible RGB images and the one or more infrared thermal aerial images.

11. A system comprising:
a computing device comprising a processor and a memory;
machine-readable instructions stored in the memory that, when executed by the processor, cause the computing device to at least:
acquire one or more infrared thermal aerial images of a building and one or more visible RGB aerial images of the building;
identify structural components of the building based on the one or more infrared thermal aerial images of the building, wherein a floor structure of the building is identified from a color change in the one or more infrared thermal aerial images between the building and a foundation structure of the building;
position a bounding box around the floor structure of the building present in the one or more infrared thermal aerial images; and
estimate a lowest floor elevation of the building by calculating a lowest floor elevation value based on an amount of image pixels representing a distance between a top of the bounding box and a top of the foundation structure of the building.

12. The system of claim 11, wherein the lowest floor elevation value for the building is calculated by converting the amount of image pixels representing the lowest floor elevation into the lowest floor elevation value in terms of a measurement of distance using a pixel ratio factor.

13. The system of claim 12, wherein the measurement of distance comprises feet under an imperial measurement system and the pixel ratio factor comprises a pixel per feet ratio.

14. The system of claim 13, wherein a view of the building is tilted in at least one of the one or more infrared thermal aerial images, wherein the machine-readable instructions, when executed by the processor, further cause the computing device to generate a corrected right angle infrared thermal aerial image of at least a portion of the building by horizontally distributing pixels along a straight line across the portion of the building, wherein the pixel ratio factor is determined using the corrected right angle infrared thermal aerial image.

15. The system of claim 11, wherein an obstruction is present in the one or more infrared thermal aerial images and the bounding box is positioned by joining two bounded boxes on each side of the obstruction.

16. The system of claim 11, wherein the machine-readable instructions, when executed by the processor, further cause the computing device to configure a flight plan for an unmanned aerial vehicle to a plurality of buildings and transmit the flight plan to the unmanned aerial vehicle, wherein the unmanned aerial vehicle acquires the one or more infrared thermal aerial images and the one or more visible RGB aerial images.

17. The system of claim 11, wherein the machine-readable instructions, when executed by the processor, further cause the computing device to predict a foundation type for the building based on the one or more visible RGB aerial images.

18. The system of claim 17, wherein the computing device is trained to predict the foundation type using a database of building images.

19. The system of claim 11, wherein the machine-readable instructions, when executed by the processor, further cause the computing device to estimate an Envelope Energy Performance signature for the building based on the one or more visible RGB aerial images and the one or more infrared thermal aerial images.

20. The system of claim 11, wherein the machine-readable instructions, when executed by the processor, further cause the computing device to determine a foundation type for the building based on the one or more visible RGB images and the one or more infrared thermal aerial images.

\* \* \* \* \*